June 2, 1964  G. MANGERIAN  3,135,306

SCREW DRIVER ATTACHMENT

Original Filed Oct. 14, 1958

INVENTOR.
George Mangerian
BY Harold E. Cole
Attorney

United States Patent Office 3,135,306
Patented June 2, 1964

3,135,306
SCREW DRIVER ATTACHMENT
George Mangerian, 76A Hancock St., Everett, Mass.
Original application Oct. 14, 1958, Ser. No. 767,138, now Patent No. 3,012,594, dated Dec. 12, 1961. Divided and this application Oct. 23, 1961, Ser. No. 146,764
4 Claims. (Cl. 145—50)

This application is a division of my pending patent application, Serial No. 767,138, now Patent No. 3,012,594, filing date October 14, 1958.

This invention relates to an attachment for screw drivers, especially developed for use when the screwing action is difficult or a perfectly straight penetration on the screw is desired.

One object of my invention is to provide bearing members associated with locking means, said bearing means being slidable along a screw driver shank and onto the tool end thereof to bear against the head of a screw to thereby eliminate rocking movement of the screw driver and thus assure that pressure on the screw driver will be straight and true.

Another object is to provide locking mechanism having a guide member slidable along the shank of a screw driver and which will hold said bearing members in predetermined position against the head of a screw until released.

Another object is to provide bearing members which, with the use of removable end members, enable said bearing members to fit over a round head of a screw or a flat head thereof.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

Figure 1:
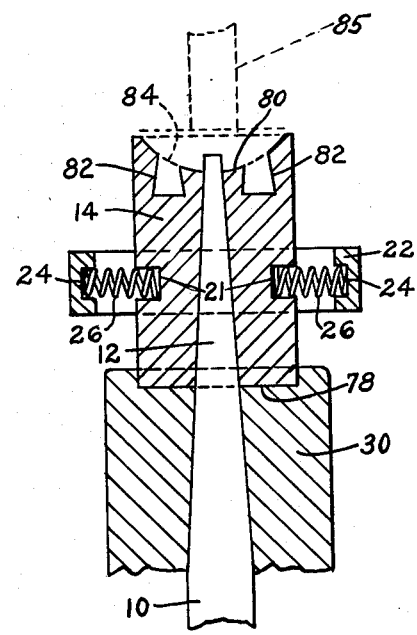
FIG. 1 is a longitudinal, sectional view taken on the line 1—1 of FIG. 3, showing my attachment in position of use on a screw driver, the latter being shown broken away, and a screw being shown in dash lines, broken away.

As illustrated, a shank 10 of a screw driver is shown, on which my screw driver attachment is movably mounted, the tool end of said shank having the usual tapered end portion 12.

A bearing assembly has two wedge-shaped bearing members 14 and 16, as shown, which are opposite each other and slidably contact said shank. They preferably taper in thickness, the thinner part being the nearer to the inner or handle end of said shank. Each said bearing member 14 and 16, has a recess 21 extending inwardly from the outside surface thereof. A collar 22 encircles said bearing members 14 and 16, having two recesses 24 extending from the inside surfaces inwardly into which, in each instance, a coil spring 26 enters, the other ends of said spring entering said bearing member recesses 21. This arrangement firmly retains said collar 22 around said bearing members since said coil springs 26 are compressed somewhat when in normal position, yet permitting said bearing members 14 and 16 to be slid on said shank 10.

When screwing action is to commence said bearing assembly is slid along said shank until it almost reaches the outside end of said shank tapered portion 12, in which position said bearing members 14 and 16 bear on the head 84 of a screw 85 later described, as shown in said FIG. 1. This keeps the screw driver steady, preventing it from tipping, thus forcing the screw straight and true into the material it penetrates.

In said FIG. 1, I show a slidable, enclosure band 30 that has a recess 78 in one end into which one end of said bearing members 14 and 16 extend. Pushing of said sliding band 30 towards the tool end of the screw driver also likewise pushes said bearing assembly. However, when moving said band 30 in the opposite direction, said bearing assembly must be moved separately.

Figure 2:
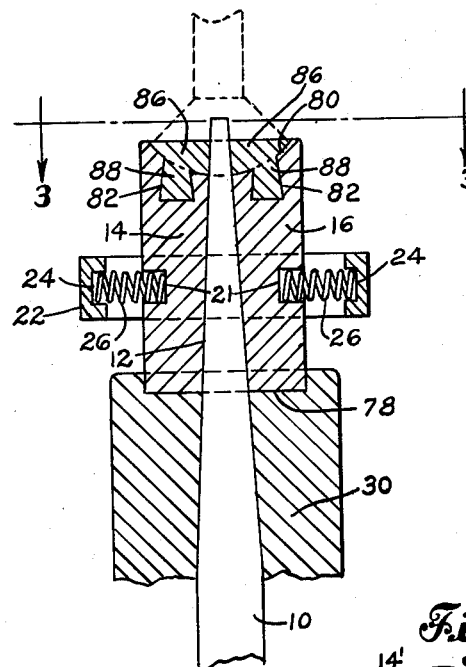
FIG. 2 is a similar longitudinal sectional view to FIG. 1; but showing two bearing inserts having flat bearing surfaces in position of use.
Figure 3:
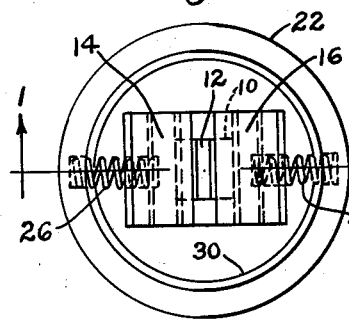
FIG. 3 is a sectional view taken on the line 3—3 of FIG. 2.
Figure 4:
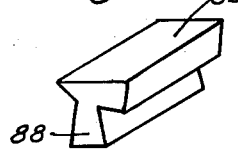
FIG. 4 is a perspective view of a bearing insert or end member.

In said FIG. 1 the outer ends of said bearing members 14 and 16 are provided with concave recesses 80 and wedge-shaped openings 82 communicating therewith. In this construction the head 84 of a round-headed screw will be received in said recesses 80. When a flat-headed screw is used, as shown in said FIG. 2, two separate bearing end members 86 are provided, each having a flat outside surface and an extension 88 as shown in said FIG. 4, which fit respectively into said recesses 80 and opening 82.

Figures 5, 7:
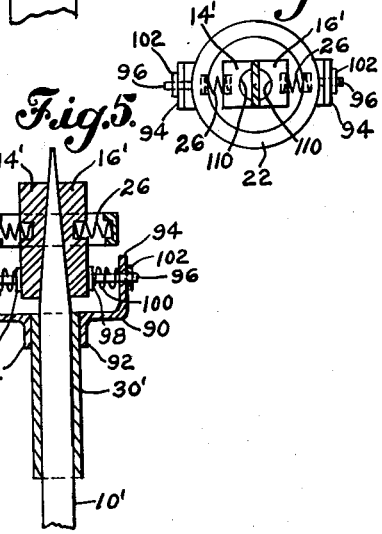
FIG. 5 is a longitudinal sectional view of my attachment with its locking mechanism, the screw driver being shown in full lines, and broken away.
FIG. 7 is a sectional view taken on the line 7—7 of FIG. 6.

In the modification of FIG. 5 I show a locking band 30' fixedly attached to bearing members 14' and 16' by means of two connecting members 90 opposite each other, one angular end 92 of each being attached, as by welding, to said band 30', while another angular end or arm 94 has a hole therethrough to receive a pin 96 having a head 98 which is attached, as by welding, in each instance, to said bearing members 14' and 16'. A coil spring 100 is compressed between a said arm 94 and said head 98, in each instance, and a nut 102 at the outside of said arm 94 holds the assembly together. This arrangement permits said bearing members 14' and 16' to slide off the tool end of a shank 10 onto the main or thicker part thereof since compression of said springs 100 provides a space for said bearing members to slide onto said thicker part.

Figure 6:
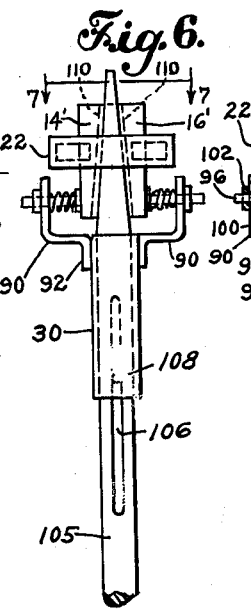
FIG. 6 is a side elevational view showing a modified form of my attachment similar to FIG. 5; but applied to a screw driver shank that is round in cross section.

In the modification of FIG. 6 a screw driver shank 105 is shown that is round in cross section, and to assure that said locking band 30' will move in a true line, I provide an elongate groove 106 in said shank 105 and said band 30' has a knob 108 that slides in said groove. Said bearing members 14' and 16', at their inner surfaces, may also be provided with concave recesses 110 as shown in said FIG. 7 to permit them to slide freely and truly along said round shank 105 when moved off the tool end of said shank.

What I claim is:

1. A screw driver attachment in combination with a screw driver embodying a shank, said attachment comprising two bearing members opposite each other and slidable along said shank, means encircling and holding said bearing members in slidable association with said shank, an enclosure member slidable along said shank and positioned rearwardly of said bearing members, and means spaced rearwardly of the first means connecting said bearing members and said enclosure member.

2. A screw driver attachment comprising two bearing members slidable along the shank of a screw driver and normally spaced apart in position of use, means holding said members in slidable association with said shank when spaced apart, and locking mechanism embodying a sliding member slidable on said shank, two connecting members attached to said sliding member and extending laterally opposite said bearing members, and means between said connecting members and said bearing members embodying spring members adapted to be compressed when said bearing members are slid along certain portions of said shank.

3. A screw driver attachment comprising two bearing members slidable along the shank of a screw driver and normally spaced apart in position of use, means holding said members in slidable association with said shank when spaced apart, and locking mechanism embodying a sliding member slidable on said shank, two connecting members attached at one end to said sliding member and embodying arms extending laterally opposite said bearing members, pin members between said arms and said bearing members and spring members around said pin members between said arms and bearing members adapted to be compressed when said bearing members are slid along certain portions of said shank.

4. A screw driver attachment comprising two bearing members slidable along the shank of a screw driver and normally spaced apart in position of use, means holding said members in slidable association with said shank when spaced apart, and locking mechanism embodying a sliding member slidable on said shank, two connecting members attached at one end to said sliding member embodying members extending angularly outward and arm members extending laterally opposite said bearing members and having holes therethrough, pin members bearing against said bearing members and extending through said holes, coil springs between said bearing members and said arms adapated to be compressed when said bearing members are slid along certain portions of said shank, and members attached to said pin members outside said arms and holding said pin members firmly in position.

References Cited in the file of this patent
UNITED STATES PATENTS

| | | |
|---|---|---|
| 1,726,693 | Clemetson | Sept. 3, 1929 |
| 2,300,308 | Ojalvo | Oct. 27, 1942 |
| 2,688,991 | Doyle | Sept. 14, 1954 |

FOREIGN PATENTS

| | | |
|---|---|---|
| 259,902 | Switzerland | June 16, 1949 |